United States Patent Office 3,502,656
Patented Mar. 24, 1970

3,502,656
ALKYL, BENZYL AND NITRO-BENZYL ESTERS OF
α-CARBOXY-α-(FURYL OR THIENYL) METHYL
PENICILLINS
David Patrick John Neal, Leigh, near Reigate, Surrey,
and Edward Raymond Stove, Redhill, Surrey, England,
assignors to Beecham Group Limited, Brentford, Middlesex, England, a British company
No Drawing. Filed May 8, 1967, Ser. No. 636,621
Claims priority, application Great Britain, May 13, 1966,
21,274/66
Int. Cl. C07d 99/16; A61k 21/00
U.S. Cl. 260—239.1                                    6 Claims

ABSTRACT OF THE DISCLOSURE

Compounds of formula:

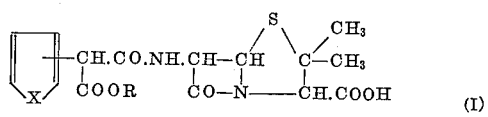

in which R is an alkyl aralkyl or a ring-substituted aralkyl group and X is a sulfur or oxygen atom, and their non-toxic salts, are valuable antibacterial agents and show activity against Gram-positive and Gram-negative bacteria.

---

This invetnion relates to new penicillins and is particularly concerned with a new class of penicillins which are derivatives of 6-aminopenicillanic acid and which are of value as antibacterial agents, as nutritional supplements in animal feeds, as agents for the treatment of mastitis in cattle and as thereapeutic agents in poultry and animals, including man, in the treatment of infectious diseases caused by Gram-positive and Gram-negative bacteria. These penicillins are also valuable intermediates in the prepaartion of the corresponding α-carboxy compounds, which are claimed in our Patent No. 3,282,926.

Accordingly the present invention provides penicillins of the general formula:

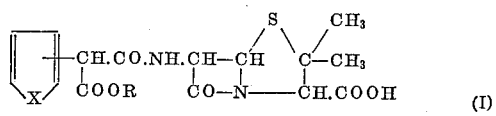

and non-toxic salts thereof, wherein R is an alkyl, aralkyl or a ring-substituted aralkyl groups, and X is a sulpur or oxygen atom.

Preferably, X is a sulphur atom and R is a benzyl group.

The salts are non-toxic salts including non-toxic metallic salts, such as sodium, potassium, calcium, aluminium, ammonium and substituted ammonium salts, e.g. salts of such non-toxic amines as trialkylamines, including triethylamine, procaine, dibenzylamine, N-benzyl-β-phenethylamine, 1-ephenamine, N,N'-dibenzylethylenediamine, dehydroabiethylamine, N,N'-bis-dehydroabietylethylenediamine, and other amines which have been used to form salts with benzylpenicillin.

The invention also provides a process for preparing the penicillins of Formula I, which process comprises reacting a reactive derivative of an acid of the general formula:

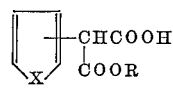

with 6-aminopenicillanic acid or a salt thereof.

Preferred reactive derivatives are the halides and anhydrides and the mixed anhydrides, for example with an alkyl chloroformate.

The penicillins of Fromula I are of particular inuterest as intermediates, since group R may be removed to give the corresponding penicillin having a free carboxyl group, in high yield and with high purity. When group R is a benzyl or substituted benzyl group, this group may be removed by catalytic hydrogenation. The group R may also be removed by enzymatic hydrolysis, for example with α-chymotrypsin, pancreatin or enzymes derived from Aspergillus sp.

The following examples illustrate the invention:

EXAMPLE 1

Paragraphs (a), (b) and (c) describe the preparation of the starting acid chloride, paragraph (d) describes its use in preparing a penicillin according to the present invention and paragraph (e) describes the use of this penicillin as an intermediate.

(a) Diethyl 3-thienylmalonate (16. g., 0.066 mole; Campayne and Patrick, J. Amer. Chem. Soc., 1955, 77, 5426) was added to a stirred solution of analytical reagent grade potassium hydroxide (9.25 g., 0.165 mole) in water (9.25 ml.). The mixture quickly crystallised, then spontaneously reacted, exothermically, to give a clear solution, which was reluxed for 1 hour. The solution was then cooled, diluted with water (20 ml.), washed with ether (2× 50 ml.), acidified (pH 1) with concentrated hydrochloric acid (16 ml.), and extracted three times with ether (50 ml.). The combined ethereal extracts were dried and decolorized with a mixture of magnesium sulphate and charcoal, clarified by filtration, and evaporated at low temperature and pressure to give 11.8 g. (96%) of a pale yellow solid, M.P. 123–126° C. (decomp.). Thorough mixing of this solid with benzene (60 ml.) with a pestle and mortar, followed by filtration and washing on the filter with fresh cold benzene (2× 10 ml.) gave a white solid which was dried in vacuo to give 3-thienylmalonic acid (10.9 g.), M.P. 128–129° C. (decomp.).

(b) 3-thienylmalonic acid (1.0 g., 5.4 millimoles) in dry ether (2.5 ml.) and thionyl chloride, (0.43 ml. 6 millimoles) were refluxed together in a bath at 45 to 50° C. for 1 hour. Benzyl alcohol (0.56 ml., 5.4 millimoles) was added and refluxing was continued for a further 1 hour.

The reaction mixture was cooled, diluted with ether (10 ml.) and washed with water (2× 10 ml.). The ethereal layer was then extracted with N sodium bicarbonate (10 ml., 5 ml.) and water (5 ml.), and the combined aqueous alkaline extractions were freed from dissolved ether by passing a stream of air through the solution for about 10 minutes. Acidification of these aqueous extracts gave a heavy oil, which was induced to crystallize. Crystallization was allowed to become complete overnight, then the solid was collected by filtration, washed on the filter with fresh cold water (3× 5 ml.), and dried in vacuo to give 0.72 g., M.P. 88–91° C. Dissolution in ether and treatment with decolorizing charcoal gave a pale yellow solid, which on recrystallization from hot benzene (3 volumes) and then washing the crystalline material on the filter with cold benzene gave an 80% recovery of colourless monobenzyl 3-thienylmalonate, M.P. 91–92° C.

Calculated for $C_{14}H_{12}O_4S$ (percent): C, 60.8; H, 4.35; S, 11.6. Found (percent): C, 60.0; H, 4.40; S, 11.2.

(c) A mixture of monobenzyl 3-thienylmalonate (1.38 g., 5 millimoles) and thionyl chloride (2.5 ml.) was warmed at 50 to 55° C. for 1 hour, then at 60 to 65° C. for 10 minutes. The excess of thionyl chloride was removed in vacuo at not more than 30° C., the last traces being removed by codistillation with dry benzene (1 ml.)

under high vacuum, leaving monobenzyl 3-thienylmalonyl chloride as a yellow oil.

(d) The acid chloride obtained as described in paragraph (c) above was dissolved in dry acetone (10 ml.) and added in a steady stream to a stirred solution of 6-aminopenicillanic acid (1.08 g., 5 millimoles) in a mixture of N sodium bicarbonate (15 ml.) and acetone (5 ml.). After the initial reaction the reaction mixture was stirred at room temperature for 45 minutes, then washed with ether (3× 25 ml.). Acidification of the aqueous solution with N hydrochloric acid (11 ml.) to pH 2 and extraction with ether (3× 15 ml.) gave an ethereal extract which was decolorized with a mixture of activated charcoal and magnesium sulphate for 5 minutes. The resulting pale yellow ethereal solution was shaken with sufficient N sodium bicarbonate (4 ml.) to give an aqueous extract of pH 7 to 7.5. This extract was concentrated to a syrup at low temperature and pressure, then isopropanol was added with stirring until the mixture contained about 10% water. Crystallization was initiated, and completed at about 0° overnight, to give the sodium salt of α - (benzyloxycarbonyl)3 - thienylmethylpenicillin as white crystals in 50% weight yield. This product was estimated by colorimetric assay with hydroxylamine to contain 91% of the anhydrous sodium salt.

(e) A solution of the sodium salt of α-(benzyloxycarbonyl)3-thienylmethylpenicillin (2.13 g., 4.3 millimoles) in water (30 ml.) was added to a suspension of 5% palladium on calcium carbonate (10.65 g.) in water (32 ml.) which had been prehydrogenated for 1 hour. The mixture was then hydrogenated at just above atmospheric pressure for 1½ hours and filtered through a Dicalite bed. The clear filtrate was evaporated at low temperature and pressure, and the residue dried in vacuo over phosphorous pentoxide, to give 1.64 g. of the salt of α-carboxyl - α - (3 - thienyl)methylpenicillin as a white solid. Colorimetric assay with hydroxylamine showed this salt to contain 94% of the anhydrous penicillin. Paper chromatography showed complete reduction of the benzyl group.

EXAMPLE 2

(a) Mono-(p-nitrobenzyl)3-thienylmalonate 3-thienylmalonic acid (9.3 g. 0.05 mol) in dry ether (30 ml.) was treated with thionyl chloride (5.95 g. 3.63 ml. 0.05 mol) and dimethylformamide (1 drop). The mixture was refluxed for 3 hrs. on a hot water bath. The solvent was evaporated under reduced pressure and the residue dissolved in fresh dry ether (30 ml.). p-Nitrobenzyl alcohol (7.65 g. 0.05 mol) was added all at once and the mixture refluxed for a further 2 hrs. The reaction mixture was cooled to room temperature, washed with water (10 ml.) and extracted with saturated sodium bicarbonate solution until the extracts were alkaline. The combined aqueous extracts were washed with ether (30 ml.) and acidified with 5 N hydrochloric acid solution. The precipitated oil was exhaustively extracted with methylene chloride. The combined organic extracts were washed thoroughly with water (6× 50 ml.), dried over anhydrous magnesium sulphate in the presence of activated charcoal, filtered and evaporated. The crude solid residue 6.9 g. (43%) was recrystallised from benzene/60–80 petroleum ether to give 6.4 g. (39.9%) of pale yellow crystals M.P. 117–118° C.

Found (percent): C, 52.89; H, 3.59; N, 4.27; S, 9.71. $C_{14}H_{11}O_6SN$ requires (percent) C, 52.32; H, 3.45; N, 4.36; S, 9.98.

(b) α-(p-Nitrobenzyloxycarbonyl)3-thienylmethylpenicillin sodium salt

Mono-(p-nitrobenzyl)3-thienylmalonate (3.21 g. 0.01 mol) was mixed with thionyl chloride (10 ml.) and heated in a water bath at 75° C. for 1 hour. The excess thionyl chloride was evaporated under reduced pressure. The residue was mixed with dry benzene (5 ml.) and again evaporated to dryness to remove residual thionyl chloride. The final residue was dissolved in dry acetone (50 ml.) and added, with stirring, to a solution of 6-amino-penicillanic acid (2.16 g. 0.01 mol) in water (50 ml.) N sodium hydroxide (10 ml.), N sodium bicarbonate (15 ml.) and acetone (25 ml.) cooled to 12° C. The reaction mixture was stirred at room temperature for 2 hrs. The resulting solution was extracted with ether (3× 30 ml.) and the extracts discarded. The aqueous layer was covered with ether (30 ml.) and acidified, with rapid stirring, to pH 2 with N hydrochloric acid. The ether layer was separated and the aqueous layer extracted with ether (2× 30 ml.). The combined ether extracts were washed with water (10 ml.) and extracted with N sodium bicarbonate solution to pH 7. The neutral aqueous extract was evaporated under reduced temperature and pressure. The residue was dried over phosphorous pentoxide in vacuo to give 4 g. (74%) of the penicillin sodium salt as an amorphous solid.

EXAMPLE 3

(a) Mono-ethyl 3-thienylmalonate 3-thienylmalonic acid (9.3 g. 0.05 mol.) in dry ether (30 ml.) was converted to the mono acid chloride and reacted with ethyl alcohol (2.3 g.) as described in Example 2(a). The crude solid 3.9 g. (36.5%) was recrystallised from benzene/60–80 petroleum ether to give a pale yellow crystalline solid 2.9 g. (22.4%) M.P. 73–75° C.

Found (percent): C, 50.67; H, 5.12; S, 14.82. $C_9H_{10}O_4S$ requires (percent) C, 50.47; H, 4.70; S, 14.96.

(b) α-(Ethoxycarbonyl)-3-thienylmethyl penicillin sodium salt

Mono-ethyl 3-thienylmalonate (2.14 g. 0.01 mol) was converted to the acid chloride and reacted with 6-aminopenicillanic acid (2.16 g. 0.01 mol.) as described in Example 2(b) to give the penicillin sodium salt 4.1 g. (94.5%) as an amorphous solid.

EXAMPLE 4

Monoethyl 3-thienylmalonate (107 g. 0.05 mol) was dissolved in dry acetone (10 ml.), cooled to −10° C., and treated with triethylamine (0.7 ml.) followed by ethyl chloroformate (0.48 ml.). The mixture was stirred at −5° C. 6-aminopenicillanic acid (1.08 g. 0.005 mol.), in N sodium hydroxide solution (5 ml.) and acetone (5 ml.), cooled to 0° C., was added to the mixed anhydride solution and the mixture stirred at room temperature for 1 hour. Acetone was evaporated under reduced temperature and pressure. The residue was covered with ether (20 ml.) acidified with N hydrochloric acid to pH 2 and the organic layer separated. The aqueous layer was re-extracted with ether (2× 20 ml.), the ether extracts combined and washed with water (5 ml.). The ether solution was extracted with N sodium bicarbonate solution to pH 7. The neutral aqueous extract was evaporated under reduced temperature and pressure and the residue dried over phosphorous pentoxide in vacuo to give a solid which was shown by paper chromatography to contain the same penicillin as that described in Example 3(b).

EXAMPLE 5

(a) Monobenzyl 2-ethienylmalonate

This half ester was prepared from 2-thienylmalonic acid either by treatment with phenyldiazomethane in ether or by treatment with oxalylchloride followed by benzyl alcohol. In either case it was freed from neutral reaction products by extraction into sodium bicarbonate solution followed by acidification. The product was a yellow oil having satisfactory i.r. and n.m.r. spectra, but which could not be distilled without decarboxylation.

(b) α-(Benzyloxycarbonyl)-2-thienylmethylpenicillin sodium salt

Monobenzyl 2-thienylmalonate (0.89 g.) in methylene chloride (4 ml.) was treated with oxalyl chloride (0.34 ml.) and refluxed for 2 hr. The solvent was removed in vacuo at room temperature, then dry benzene was added and the evaporation repeated to remove final traces of oxalyl chloride. The residual oily acid chloride was dissolved in dry acetone (16 ml.) and added to a stirred solution prepared from 6-aminopenicillanic acid (0.70 g.), water (16 ml.), N sodium hydroxide (3.3 ml.), N sodium bicarbonate (4.9 ml.), and acetone (8 ml.). The mixture was stirred at room temperature for 1 hr. and then worked up as described in Example 2(b) to give 0.82 g. of crude penicillin sodium salt.

A portion of the product was subjected to paper chromatography in butanol/ethanol/water and the chromatogram was developed on an agar plate seeded with *B. subtilis*. The major zone of inhibition of bacterial growth, $R_F$ 0.57, was attributed to α-(benzyloxycarbonyl)-2-thienylmethylpenicillin, a smaller zone ($R_F$ 0.38) to 2-thienylmethylpenicillin, and a very small zone ($R_F$ 0.03) to α-carboxy-2-thienylmethylpenicillin.

EXAMPLE 6

(a) Monomethyl 2-furylmalonate

Anethereal solution of diazomethane (prepared from 3.95 of nitrosomethylurea) was added to a solution of 2-furylmalonic acid (3.91 g.) in ether and set aside at room temperature. When reaction was complete the solution was extracted with sodium bicarbonate solution, then the extracts were acidified and re-extracted with methylene chlorde. The latter extracts were throughly washed with brine, dried, and evaporated at room temperature in vacuo to leave the half ester as a yellow oil (0.62 g.) with satisfactory i.r. and n.m.r. spectra.

(b) α-(Methoxycarbonyl)-2-furylmethylpenicillin sodium salt

Monomethyl 2-furylmalonate (0.337 g.) in methylene chloride (3 ml.) was treated with thionyl chloride (0.279 g.). After 2 hr. the solution was evaporated in vacuo at room temperature, then treated with dry benzene and re-evaporated to remove the last of the thionyl chloride. The residual dark oily acid chloride was allowed to react with 6-aminopenicillanic acid (0.395 g.) as described in Example 5(b) to give, after working up in the usual way, 0.25 g. of crude penicillin sodium salt.

Paper chromatography in butanol/ethanol/water revealed three zones of inhibition of bacterial growth which were assigned as follows:

α-(Methoxycarbonyl)-2-furylmethylpenicillin __ $R_F$ 0.44  
2-furylmethylpenicillin _____ $R_F$ 0.33  
α-Carboxy-2-furylmethylpenicillin _____ $R_F$ 0.03

The following table illustrates the in vitro antibacterial activity (expressed as minimum inhibitory concentrations in mcg./ml.) of several α-substituted 3-thienylmethylpenicillins of the present invention against several Gram-negative bacteria. The two *Pseudomonas* strains are highly resistant, and *Proteus morganii* is relatively resistant, to all penicillins at present commercially available.

| R | CH₂Ph | CH₂C₆H₄NO₂(p) | Et |
|---|---|---|---|
| Example No. | 1(d) | 2(b) | 3(b) |
| *E. coli* | 2.5 | 25 | 25 |
| *Salmonella typhi* | 5 | 12.5 | 25 |
| *Pseudomonas pyocyanea* A | 125 | 500 | 125 |
| *Pseudomonas pyocyanea* R59 | 12.5 | 50 | 125 |
| *Proteus morganii* | 2.5 | 12.5 | 5 |

We claim:

1. α - (Benzyloxycarbonyl) - 3 - thienylmethylpenicillin and non-toxic salts thereof.

2. α - (Benzyloxycarbonyl) - 2 - thienylmethylpenicillin and non-toxic salts thereof.

3. α - (p - Nitrobenzyloxycarbonyl) - 3-thienylmethylpenicillin and non-toxic salts thereof.

4. α - (Ethoxycarbonyl) - 3 - thienylmethylpenicillin and non-toxic salts thereof.

5. A penicillin of the general formula:

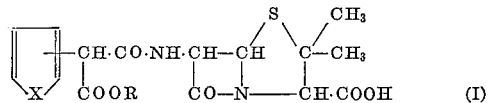

and non-toxic salts thereof, wherein R is an alkyl of 1 to 7 carbon atoms, benzyl or benzyl substituted in the ring with a nitro group, and X is a sulfur or oxygen atom.

6. The compound according to claim 5 which is α-(methoxycarbonyl)-2-furylmethyl penicillin and non-toxic salts thereof.

References Cited
UNITED STATES PATENTS
3,282,926  11/1966  Brain et al. _____ 260—239.1

NICHOLAS S. RIZZO, Primary Examiner

U.S. Cl. X.R.

260—999